United States Patent
Leng et al.

(10) Patent No.: US 12,503,025 B2
(45) Date of Patent: Dec. 23, 2025

(54) VEHICLE SEAT WITH A HEADREST

(71) Applicant: Bayerische Motoren Werke Aktiengesellschaft, Munich (DE)

(72) Inventors: Michael Leng, Geltendorf (DE); Mathias Schmidt, Munich (DE); Tobias Trautwein, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 158 days.

(21) Appl. No.: 18/274,248

(22) PCT Filed: Jun. 10, 2022

(86) PCT No.: PCT/EP2022/065782
§ 371 (c)(1),
(2) Date: Jul. 26, 2023

(87) PCT Pub. No.: WO2022/268524
PCT Pub. Date: Dec. 29, 2022

(65) Prior Publication Data
US 2024/0083316 A1    Mar. 14, 2024

(30) Foreign Application Priority Data
Jun. 21, 2021  (DE) .................... 10 2021 115 982.2

(51) Int. Cl.
*B60N 2/879*  (2018.01)
*B60N 2/00*  (2006.01)
(Continued)

(52) U.S. Cl.
CPC ............. *B60N 2/888* (2018.02); *B60N 2/806* (2018.02); *B60N 2/879* (2018.02); *B60N 2205/20* (2013.01)

(58) Field of Classification Search
CPC .................... B60N 2/879; B60N 2/80
See application file for complete search history.

(56) References Cited

U.S. PATENT DOCUMENTS 7,685,661 B2 *  3/2010  Popilek ................. A61M 21/00
                                                   5/639
7,992,932 B2 *  8/2011  Hartlaub ............ B60N 2/42781
                                                  297/216.12
(Continued)

FOREIGN PATENT DOCUMENTS

CN        103909986 A      7/2014
CN        106166969 A      11/2016
(Continued)

OTHER PUBLICATIONS

International Search Report (PCT/ISA/210) issued in PCT Application No. PCT/EP2022/065782 dated Sep. 27, 2022 with English translation (5 pages).
(Continued)

*Primary Examiner* — Shin H Kim
(74) *Attorney, Agent, or Firm* — Crowell & Moring LLP

(57) ABSTRACT

A vehicle seat has a seat base element, a seat back and a headrest that has a headrest mount connected or connectable to the seat back. The headrest mount is connected to an inner headrest structure. At least one mechanical or electromechanical active element is located in the headrest. The active element is fastened to the headrest structure or to the headrest mount by way of at least one elastic mounting element.

6 Claims, 2 Drawing Sheets

(51) Int. Cl.
  *B60N 2/806* (2018.01)
  *B60N 2/888* (2018.01)
  *B60N 2/90* (2018.01)

(56) References Cited

U.S. PATENT DOCUMENTS

| | | | |
|---|---|---|---|
| 10,064,496 B2* | 9/2018 | Takada | B60R 11/02 |
| 10,328,831 B2* | 6/2019 | Takada | H04R 1/025 |
| 10,457,179 B1 | 10/2019 | Kentley-Klay | |
| 11,813,970 B2* | 11/2023 | Kerkmann | B60N 2/879 |
| 2004/0227372 A1 | 11/2004 | Lavelle et al. | |
| 2010/0127541 A1 | 5/2010 | Kotz | |
| 2010/0148550 A1* | 6/2010 | Kidd | B60N 2/818 381/86 |
| 2014/0270322 A1* | 9/2014 | Silverstein | B60N 2/4214 381/391 |
| 2014/0355783 A1* | 12/2014 | Subat | H04R 5/023 381/86 |
| 2016/0100250 A1* | 4/2016 | Baskin | H04R 1/02 297/217.4 |
| 2016/0255430 A1* | 9/2016 | Fujita | B60N 2/879 381/333 |
| 2016/0339817 A1 | 11/2016 | Mizobata et al. | |
| 2017/0106775 A1* | 4/2017 | Takada | H04R 1/2819 |
| 2020/0055434 A1 | 2/2020 | Hunt | |
| 2020/0156795 A1 | 5/2020 | Knight | |
| 2020/0282889 A1* | 9/2020 | Groleau | H04R 1/28 |
| 2021/0061152 A1* | 3/2021 | Servadio | B60N 2/879 |
| 2022/0371496 A1* | 11/2022 | Cahill | B60N 2/876 |
| 2024/0073597 A1* | 2/2024 | Ito | H04R 1/2834 |

FOREIGN PATENT DOCUMENTS

| | | |
|---|---|---|
| DE | 10 2009 038 631 A1 | 5/2010 |
| DE | 10 2018 201 927 A1 | 8/2019 |
| DE | 10 2010 002 159 A1 | 5/2021 |
| EP | 3 002 152 A1 | 4/2016 |
| JP | 2011-68304 A | 4/2011 |
| KR | 10-2016-0052008 A | 5/2016 |

OTHER PUBLICATIONS

German-language Written Opinion (PCT/ISA/237) issued in PCT Application No. PCT/EP2022/065782 dated Sep. 27, 2022 (6 pages).

German-language Search Report issued in German Application No. 10 2021 115 982.2 dated Feb. 10, 2022 with partial English translation (10 pages).

English translation of Chinese-language Office Action issued in Chinese Application No. 202280008651.8 dated Jul. 16, 2025 (6 pages).

* cited by examiner

VEHICLE SEAT WITH A HEADREST

TECHNICAL FIELD

The invention relates to a vehicle seat with a seat base element, a backrest and a headrest. It furthermore relates to a vehicle, in particular a motor vehicle, with at least one vehicle seat of this type.

BACKGROUND AND SUMMARY

Vehicle seats, which are becoming ever heavier as a result of comfort and safety functions, such as, for example, audio systems and crash actuators, have a tendency to vibrate, which is caused by vibration excitation emanating from the vehicle. This vibration is especially annoying on the headrest. However, it can also have an effect on the entire seat. Vibration absorbers are preferably integrated in the seat structure and are heavy and cost-intensive. The provision of a vibration absorber in the seat structure is a compromise and cannot sufficiently absorb the vibration of the headrest.

US 2016/0339817 A1 discloses and describes a vehicle seat with a headrest in which a damping element is provided which comprises a damping body suspended elastically in the headrest. Said damping body forms an additionally provided vibrating mass which is provided specifically and exclusively for the damping function.

US 2004/0227372 A1 discloses and describes a vehicle seat with a headrest in which an entertainment system, which is provided with a screen, for the passengers sitting behind the vehicle seat is installed.

US 2020/0055434 A1 discloses a headrest with integrated loudspeakers. The loudspeakers are fitted in a loudspeaker housing which is provided in the interior of the headrest and is connected to the headrest structure. The loudspeaker housing is surrounded by the headrest upholstery. The loudspeaker housing can be formed from a semi-flexible material which permits deformation of the loudspeaker housing.

It is the object of the present invention to improve a vehicle seat of the type in question.

This object is achieved by the features of the independent claim.

A vehicle seat which is provided with a seat base element, a backrest and a headrest which has a headrest mount which is connected or is connectable to the backrest and is connected to an inner headrest structure, wherein at least one mechanical or electromechanical active element is contained in the headrest, is distinguished in that the active element is fastened in an elastically suspended manner to the headrest structure or to the headrest mount by way of at least one elastic mount element and forms an oscillating mass which damps externally excited vibrations of the headrest.

An active element is understood here as meaning an element which has an independent active functionality and does not serve—like a dead mass—exclusively for vibration damping. Such an active element integrated in the headrest can be, for example, an entertainment system, a monitor, a loudspeaker, an actuator for adjusting the headrest, or a crash actuator which, in the event of a collision, triggers an actuation of a safety device of the headrest, but other functional elements can also form an active element within the meaning of the invention.

Such an active element which is integrated in the headrest, such as, for example, a loudspeaker, a variable displacement motor, an adjustment mechanism, or a crash actuator, is mounted elastically in the headrest on the headrest mount and/or on the headrest structure and thus acts as a vibration absorber. Compared to the prior art, an active element provided for functional purposes and in the headrest therefore forms the vibrating mass for the damping functionality.

Further preferred and advantageous design features of the vehicle seat according to the invention are the subject matter of the dependent claims.

The active element is preferably a loudspeaker. It is also advantageous if the active element is a crash actuator. An embodiment of the invention in which the active element is an adjustment mechanism for the headrest is also preferred. Finally, it is also advantageous if the active element is a drive motor for the adjustment mechanism.

These embodiments can also be combined with one another, that is to say that a plurality of such active elements can jointly or in each case individually form a damping mass which is mounted elastically on the headrest structure or on the headrest mount.

The invention is furthermore directed toward a vehicle, in particular a motor vehicle, which is equipped with at least one such vehicle seat.

Preferred exemplary embodiments of the invention, together with additional design details and further advantages, are described and explained in more detail below with reference to the accompanying drawings.

DETAILED DESCRIPTION OF THE DRAWINGS

Figure 1:
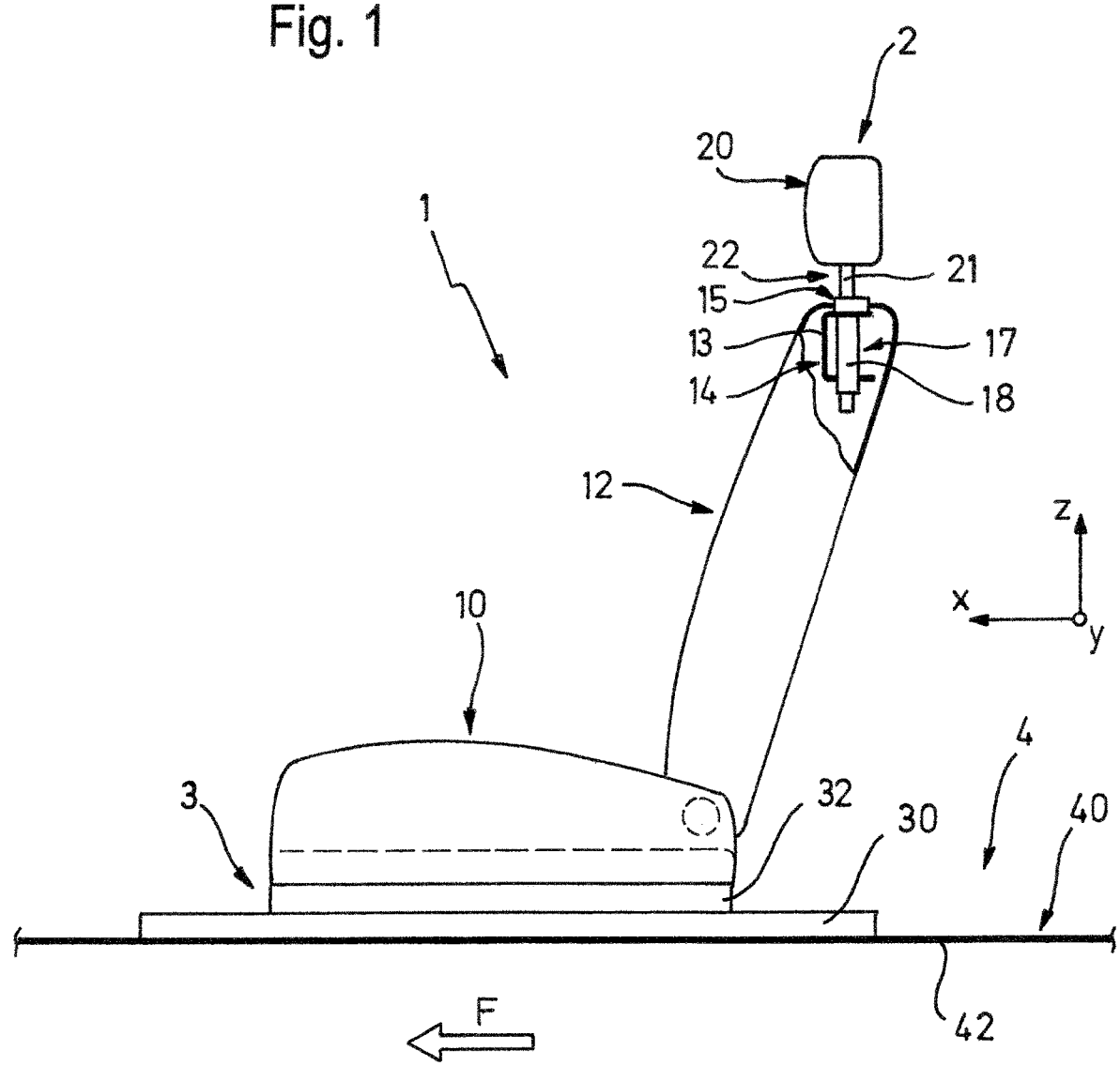
FIG. 1 shows an exemplary vehicle seat according to the invention in a partially sectioned side view.

FIG. 1 shows a vehicle seat 1 in a stylized, partially sectioned side view with a seat base element 10 and a backrest 12 which is provided with a headrest 2 on its upper side. The seat base element 10 is connected by means of a seat longitudinal adjustment device 3 to a floor panel 42, which floor panel is part of the vehicle structure 40 of a vehicle 4, in a manner known to a person skilled in the art, for example by screwing. The seat longitudinal adjustment device 3 has a left and a right bottom rail 30 which are connected to the floor panel 42. Each bottom rail 30 is assigned a top rail 32 which is mounted displaceably and lockably with respect to the respective bottom rail 30.

The headrest 2 has an upper upholstered headrest body 20 which is held on a backrest crossmember 13 of an inner backrest structure 14 of the backrest 12 by way of two laterally spaced-apart support rods 21 of a headrest mount 22. For this purpose, the support rods 21 of the headrest mount 22, of which support rods only one is illustrated in the figures, enter through a respective guide sleeve 15, which is provided on the upper side of the backrest 12 and is connected to the backrest structure 14, into the interior of the backrest 12 and are each accommodated there in a height-adjustable and lockable manner in a tubular receptacle 18, which forms a guide arrangement 17, on the backrest structure 14 of the backrest 12.

Figure 2:
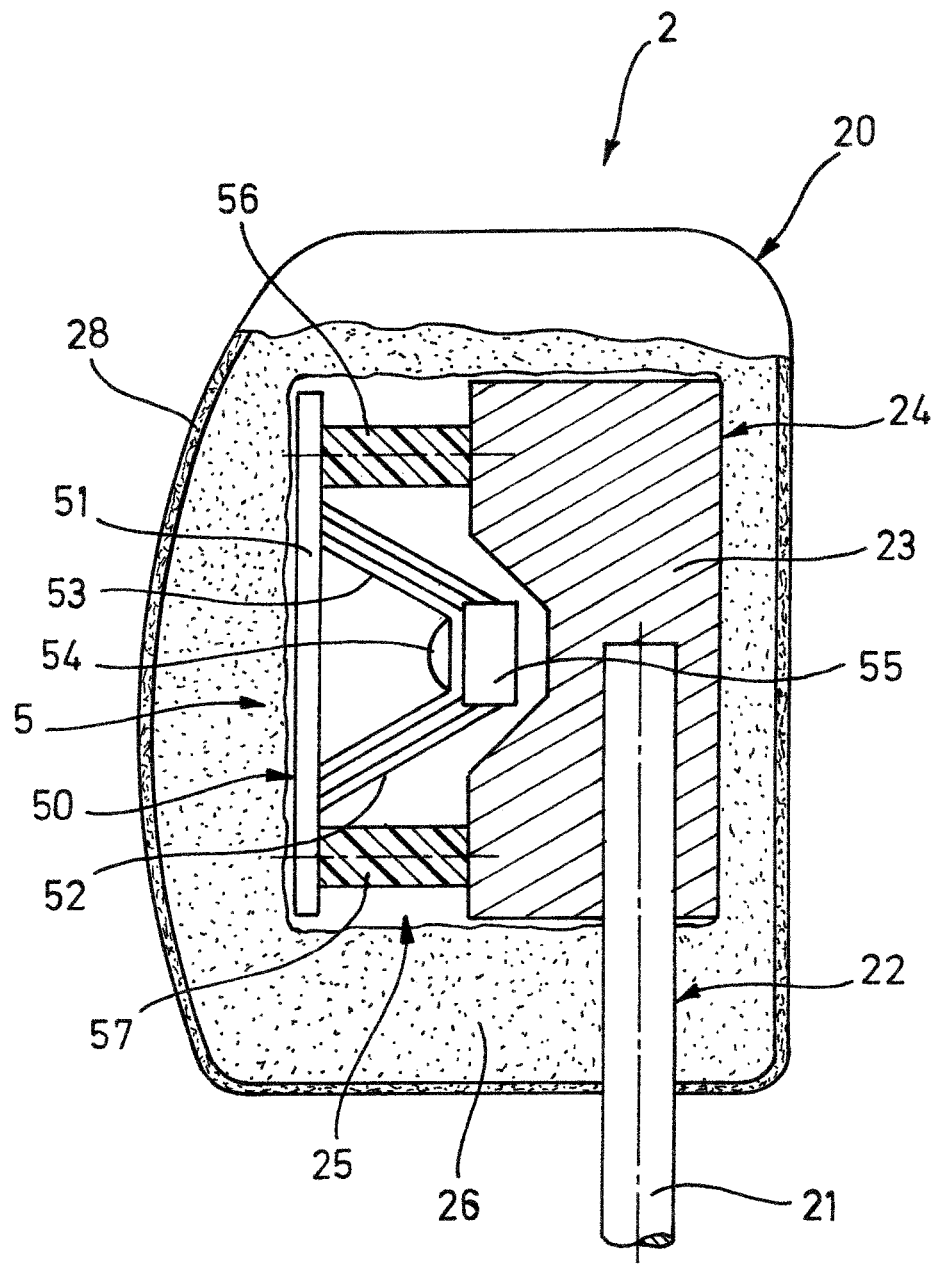
FIG. 2 is a partially sectioned headrest of a vehicle seat according to FIG. 1.

The headrest 2, which is shown in detail in FIG. 2 and is illustrated in partially sectioned form, has, in its interior, a stiff structural element 23 of a headrest structure 24, the structural element 23 being connected rigidly or pivotably to the support rods 21 of the headrest mount 22, and upholstery 26 which surrounds said headrest structure, is composed, for example, of an elastic foam material and is surrounded by a cover 28 made from cloth, leather or synthetic leather.

A cavity 25 of the upholstery 26, which cavity is provided in front of the structural element 23, contains an electromechanical active element 5 which, in the example shown, is formed by a loudspeaker 50 which, in a manner known per se, has a loudspeaker frame 51 with a loudspeaker basket 52, a loudspeaker diaphragm 53 attached to the latter, and an oscillating coil 54 which is connected to the loudspeaker diaphragm 53 and is designed as a plunger coil and is accommodated in an axially movable manner in a magnetic arrangement 55 connected to the loudspeaker basket 52. The active element 5, i.e. the loudspeaker 50, is fastened to the headrest structure 24 by way of four elastic mount elements 56, 57, of which only the two left ones are illustrated in FIG. 2. The active element 5 which is elastically suspended on the headrest structure 24 by means of said elastic mounting, i.e. the loudspeaker 50 here, forms an oscillating mass which damps externally excited vibrations of the headrest.

The invention is not limited to the above exemplary embodiment which merely serves for the general explanation of the basic concept of the invention. Rather, the device according to the invention can also adopt different embodiments from those described above within the scope of protection. The device here can have in particular features which represent a combination of the respective individual features of the claims.

Reference signs in the claims, the description and the drawings serve merely for improved understanding of the invention and are not intended to limit the scope of protection.

LIST OF REFERENCE SIGNS

1 Vehicle seat
2 Headrest
3 Seat longitudinal adjustment device
4 Vehicle
5 Active element
10 Seat base element
12 Backrest
13 Backrest crossmember
14 Inner backrest structure
15 Guide sleeve
17 Guide arrangement
18 Tubular receptacle
20 Upper headrest body
21 Support rod
22 Headrest mount
23 Stiff structural element
24 Headrest structure
25 Cavity
26 Upholstery
28 Cover
30 Bottom rail
32 Top rail
40 Vehicle structure
42 Floor panel
50 Loudspeaker
51 Loudspeaker frame
52 Loudspeaker basket
53 Loudspeaker diaphragm
54 Oscillating coil
55 Magnetic arrangement
56 Elastic mount element
57 Elastic mount element

The invention claimed is:

1. A vehicle seat, comprising:
   a seat base element;
   a backrest; and
   a headrest having an inner headrest structure and a headrest mount, the headrest mount defining a plane, and being connectable to the backrest, and being connected to the inner headrest structure;
   at least one mechanical or electromechanical active element contained in the headrest, wherein the active element has an independent active functionality and does not serve as a dead mass exclusively for vibration damping, and
   wherein the active element is fastened to and spaced perpendicular and forward of the plane defined by the headrest mount in an elastically suspended manner by way of at least one elastic mount element projecting in a forward direction, and forms an oscillating mass which damps externally excited vibrations of the headrest.

2. The vehicle seat according to claim 1, wherein the active element is a loudspeaker.

3. A vehicle comprising at least one vehicle seat according to claim 1.

4. A headrest assembly, comprising:
   a headrest having an inner headrest structure and a headrest mount, the headrest mount defining a plane, and being connectable to a backrest, and being connected to the inner headrest structure;
   at least one mechanical or electromechanical active element contained in the headrest, wherein the active element has an independent active functionality and does not serve as a dead mass exclusively for vibration damping, and
   wherein the active element is fastened to and spaced perpendicular and forward of the plane defined by the headrest mount in an elastically suspended manner by way of at least one elastic mount element projecting in a forward direction, and forms an oscillating mass which damps externally excited vibrations of the headrest.

5. The headrest assembly according to claim 4, wherein an entirety of the active element is positioned forward of the plane defined by the headrest mount.

6. The vehicle seat according to claim 1, wherein an entirety of the active element is positioned forward of the plane defined by the headrest mount.

* * * * *